(12) United States Patent
Imamura et al.

(10) Patent No.: US 7,095,591 B2
(45) Date of Patent: Aug. 22, 2006

(54) HEAD SLIDER HAVING MICROACTUATOR

(75) Inventors: Takahiro Imamura, Kawasaki (JP); Yukihiro Uematsu, Kawasaki (JP); Hitoshi Kanai, Kawasaki (JP); Shinji Koganezawa, Kawasaki (JP); Ryosuke Koishi, Kobe (JP); Takeaki Shimanouchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/643,267

(22) Filed: Aug. 19, 2003

(65) Prior Publication Data

US 2004/0032693 A1 Feb. 19, 2004

Related U.S. Application Data

(63) Continuation of application No. PCT/JP01/01198, filed on Feb. 20, 2001.

(51) Int. Cl.
*G11B 5/60* (2006.01)

(52) U.S. Cl. .................................. 360/234.7

(58) Field of Classification Search ............ 360/234.7, 360/234.8, 294.3, 294.4, 245.6
See application file for complete search history.

(56) References Cited

U.S. PATENT DOCUMENTS

| 5,920,978 | A | 7/1999 | Koshikawa et al. ..... 29/603.12 |
|---|---|---|---|
| 6,278,582 | B1 | 8/2001 | Okawa et al. ............ 360/235.2 |
| 6,359,752 | B1 | 3/2002 | Imamura ................. 360/234.7 |
| 6,574,077 | B1 * | 6/2003 | Crane et al. ............. 360/294.3 |
| 6,611,399 | B1 * | 8/2003 | Mei et al. ................ 360/234.7 |
| 6,621,661 | B1 * | 9/2003 | Ichikawa et al. ........ 360/234.5 |
| 6,639,761 | B1 * | 10/2003 | Boutaghou et al. ...... 360/294.1 |
| 6,671,132 | B1 * | 12/2003 | Crane et al. ............. 360/294.5 |
| 6,735,055 | B1 * | 5/2004 | Crane et al. ............. 360/294.6 |
| 6,744,603 | B1 * | 6/2004 | Soeno et al. ............. 360/245.6 |
| 6,754,047 | B1 * | 6/2004 | Pan et al. ................ 360/294.4 |
| 6,853,517 | B1 * | 2/2005 | Hirano et al. ............ 360/294.3 |

FOREIGN PATENT DOCUMENTS

| JP | 3-245315 | 10/1991 |
|---|---|---|
| JP | 8-180623 | 7/1996 |
| JP | 8-235803 | 9/1996 |
| JP | 8-315342 | 11/1996 |
| JP | 9-231538 | 9/1997 |
| JP | 10-11923 | 1/1998 |
| JP | 11-259840 | 9/1999 |

\* cited by examiner

*Primary Examiner*—Hoa T. Nguyen
*Assistant Examiner*—Mark Blouin
(74) *Attorney, Agent, or Firm*—Greer, Burns & Crain, Ltd.

(57) ABSTRACT

A pair of slits are defined in a slider body of a head slider so as to extend from a trailing end surface to the leading end on the slider body. A movable block is established in the slider body between the slits. The slits ensure the extent of movement for the movable block. Elongated plates enable a relative displacement between the movable block and a stationary block. A head element is mounted on a trailing end surface of the movable block. The thickness of a non-magnetic layer corresponds to the gap length of the head element. The gap length of the head element can easily be controlled based on deposition of the non-magnetic layer. The thickness of the non-magnetic layer can be reduced in a relatively facilitated manner, so that the gap length of the head element can easily be minimized.

16 Claims, 9 Drawing Sheets

HEAD SLIDER HAVING MICROACTUATOR

This is a continuation of International PCT Application No. PCT/JP01/01198 filed Feb. 20, 2001.

BACKGROUND OF THE INVENTION

1. Field of the Invention

The present invention relates to a head slider including a so-called microactuator and incorporated in a magnetic storage device such as a hard disk drive (HDD), for example. In particular, the invention relates to a head slider allowing a head element to displace within a slider body by a fine amplitude.

2. Description of the Prior Art

Japanese Patent Application Publication 11-259840 discloses a head slider comprising a slider body and a support member incorporated in the slider body so as to support a read/write head element, for example. A microactuator is mounted on the slider body. The microactuator serves to realize a fine displacement of the support member in the head slider. This fine displacement allows the read/write head element to finely follow a recording track on a recording medium.

The head slider is in general made based on a process of layering. The slider body and the support member are deposited on a wafer, for example. In this case, a so-called medium-opposed surface of the slider body and the support member is inevitably defined along the upper surface of the wafer. Specifically, a non-magnetic layer for a read or write gap of the read/write head element should be formed on the support member so as to extend in a vertical direction perpendicular to the upper surface of the wafer. It is difficult to reduce the thickness of the non-magnetic layer in a process of depositing the support member on the upper surface of the wafer.

SUMMARY OF THE INVENTION

It is accordingly an object of the present invention to provide a head slider enabling a fine and swift displacement of a head element, mounted on a support body of a smaller mass, within a slider body. In addition, it is an object of the present invention to provide a head slider capable of reducing the thickness of a read and/or a write gap in a relatively facilitated manner.

According to the present invention, there is provided a head slider comprising: a slider body; a slit defined in a trailing end surface of the slider body, said slit extending from the trailing end of the slider body toward the leading end of the slider body; a movable block at least partly spaced from a stationary block of the slider body by the slit; and a head element mounted on a trailing end surface of the movable block.

The slit ensures the extent of movement for the movable block relative to the stationary block in the head slider. The thickness of a non-magnetic layer corresponds to the gap length of the head element on the trailing end surface of the movable block. Accordingly, the gap length of the head element can easily be controlled based on deposition of the non-magnetic layer. The thickness of the non-magnetic layer can be reduced in a relatively facilitated manner, so that the gap length of the head element can easily be minimized.

The slit preferably defines an elongated plate extending from the stationary block to the movable block. The elongated plate is expected to couple the movable block with the stationary block for a relative movement therebetween. Moreover, the elongated plate is preferably kept in an attitude standing from a plane including a medium-opposed surface of the slider body. The elongated plate of this type allows the movable block to displace in a lateral direction or a direction perpendicular to a recording track. The head slider may further comprise a microactuator mounted on the trailing end surface of the slider body across the slit.

The head slider of the aforementioned type may be utilized as a flying head slider incorporated within a magnetic medium drive or storage device such as a hard disk drive (HDD). In this case, a rail may be formed on the medium-opposed surface of the movable block. An air bearing surface may be defined on the rail. If the air bearing surface is defined on the movable block supporting the head element in this manner, the movable block is allowed to enjoy a stabilized flying height above the magnetic recording medium. Accordingly, the head element on the movable block can be opposed to the magnetic recording medium at a predetermined constant distance.

A pair of the slits may be employed to define the aforementioned movable block. The movable block may be defined between the slits. A void may be formed in the slider body so as to define the aforementioned elongated plate within the slide body. The void may serve to define the elongated plate between the slit and itself. The void may include a first gap extending between the slits so as to define the leading end of the movable block, and a pair of second gaps extending from the opposite ends of the first gap toward the trailing end of the slider body, respectively, in parallel with the slits. The second gaps end at positions spaced from the trailing end of the slider body. The mass of the movable block can easily be controlled in the head slider on the basis of the length measured between the first gap and the trailing end surface of the slider body. A wider variety of design can thus be ensured for designing the movable block.

In particular, the second gaps preferably extend from the opposite ends of the first gap toward the leading end of the slider body, respectively, in parallel with the slits. Even if the first gap is located closer to the trailing end of the slider body, the elongated plate of a sufficient length can be formed based on the length of the second gap extending from the first gap toward the leading end of the slider body. A wider variety of design can thus be ensured for designing the movable block as well as the elongated plate.

The above-described head slider may be combined with a so-called head suspension to provide a head assembly. In this case, a head assembly may comprise: a head suspension; a slider body mounted on the head suspension; a slit defined in a trailing end surface of the slider body, said slit extending from the trailing end of the slider body toward the leading end of the slider body; a movable block at least partly spaced from a stationary block of the slider body by the slit, said movable block displacing relative to the head suspension; and a head element mounted on a trailing end surface of the movable block.

For example, a method of making the aforementioned head slider may comprise: making head elements over the upper surface of a wafer; incising the wafer along a plane intersecting the upper surface of the wafer so as to cut off a bar material from the wafer, said bar material including a row of the head elements; shaping a medium-opposed surface of an individual slider body over the surface that has been established during the incision of the wafer; and forming a slit opened at the surface, corresponding to the upper surface of the wafer, with a high density plasma gas penetrating through the bar material from the medium-opposed surface. A deep reactive etching or inductively coupled plasma apparatus may be employed to form the slit.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
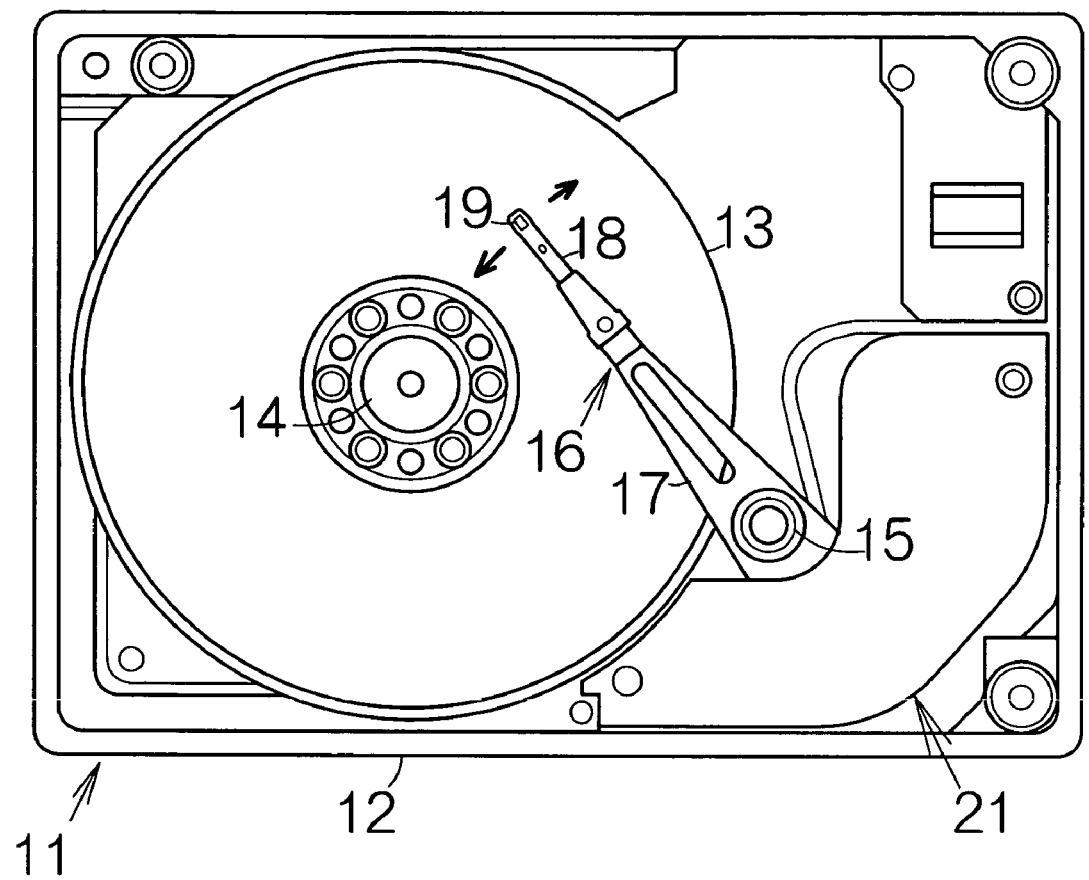
FIG. 1 is a plan view schematically illustrating the structure of a hard disk drive (HDD) as a specific example of a magnetic storage device.

FIG. 1 schematically illustrates the inner structure of a hard disk drive (HDD) 11 as a specific example of a magnetic storage device. The HDD 11 includes a box-shaped main enclosure 12 defining an inner space of a flat parallelepiped, for example. At least one magnetic recording disk 13 is incorporated in the inner space within the main enclosure 12. The magnetic recording disk 13 is mounted on the driving shaft of a spindle motor 14. The spindle motor 14 is allowed to drive the magnetic recording disk 13 for rotation at a higher revolution speed such as 7,200 rpm or 10,000 rpm, for example. A cover, not shown, is coupled to the main enclosure 12 so as to define the closed inner space between the main enclosure 12 and itself.

A carriage 16 is also incorporated within the inner space of the main enclosure 12. The carriage 16 is designed to swing about a vertical support shaft 15. The carriage 16 includes a rigid swinging arm 17 extending in a horizontal direction from the support shaft 15, and an elastic head suspension 18 attached to the tip or front end of the swinging arm 17 so as to extend forward from the swinging arm 17. As conventionally known, a flying head slider 19 is cantilevered at the front end of the head suspension 18 through a gimbal spring, not shown. The head suspension 18 serves to urge the flying head slider 19 toward the surface of the magnetic recording disk 13. When the magnetic recording disk 13 rotates, the flying head slider 19 is allowed to receive airflow generated along the rotating magnetic recording disk 13. The airflow serves to generate a lift on the flying head slider 19. The flying head slider 19 is thus allowed to keep flying above the surface of the magnetic recording disk 13 during the rotation of the magnetic recording disk 13 at a higher stability established by the balance between the lift and the urging force of the head suspension 18.

When the carriage 16 is driven to swing about the support shaft 15 during the flight of the flying head slider 19, the flying head slider 19 is allowed to cross the recording tracks defined on the magnetic recording disk 13 in the radial direction of the magnetic recording disk 13. This radial movement serves to position the flying head slider 19 right above a target recording track on the magnetic recording disk 13. An actuator 21 such as a voice coil motor (VCM) may be employed to realize the swinging movement of the carriage 16. As conventionally known, in the case where two or more magnetic recording disks 13 are incorporated within the inner space of the main enclosure 12, a pair of the elastic head suspensions 18 may commonly be mounted on the swinging arm 17 between the adjacent magnetic recording disks 13.

Figure 2:
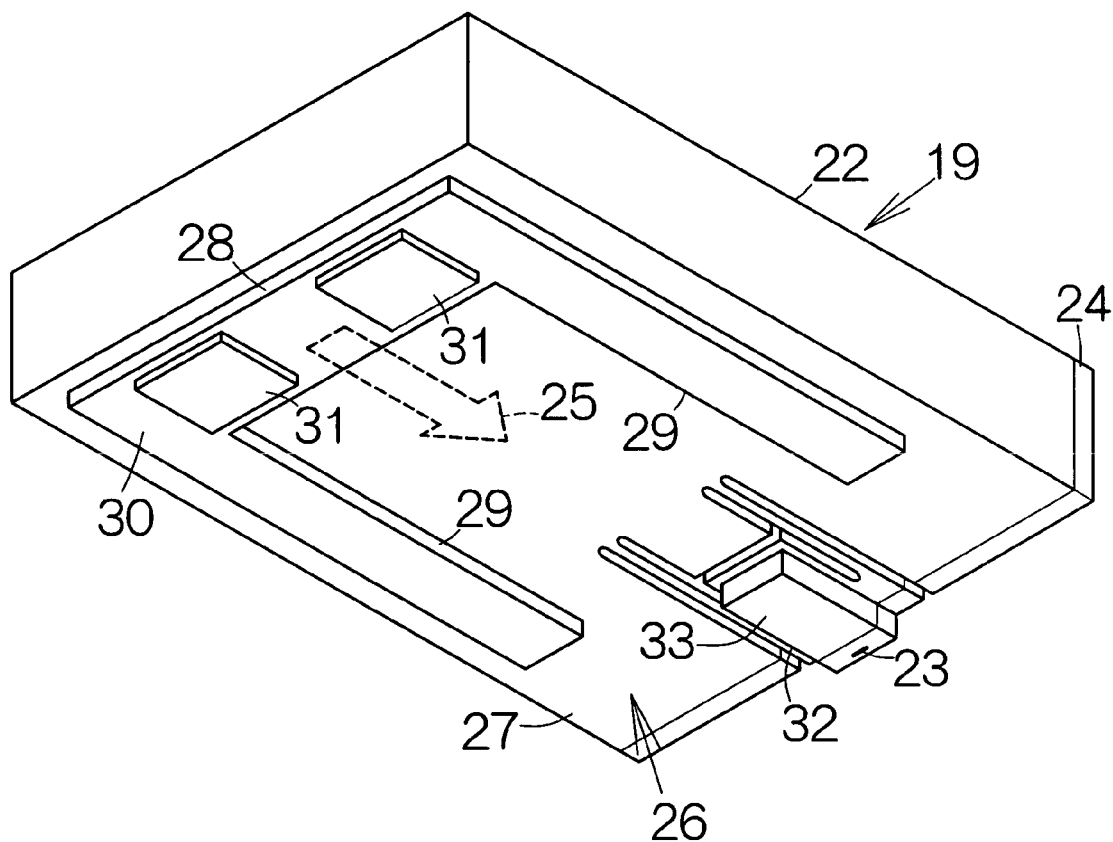
FIG. 2 is an enlarged perspective view schematically illustrating a flying head slider according to the present invention.

FIG. 2 illustrates a specific example of the flying head slider 19. The flying head slider 19 includes a slider body 22 made of Si (silicon) in the form of a flat parallelepiped. A head protection film 24 made of $Al_2O_3$ (alumina) is coupled to the outflow or trailing end of the slider body 22. The read/write electromagnetic transducer 23 is contained within the head protection film 24. The slider body 22 defines the "trailing" end and the "leading" end based on the direction of airflow 25 acting from the rotating magnetic recording disk 13. The slider body 22 and the head protection film 24 oppose a so-called medium-opposed surface or bottom surface 26 to the surface of the magnetic recording disk 13 at a distance. When the magnetic recording disk 13 rotates, the bottom surface 26 receives the airflow 25.

A front rail 28 is formed on a flat base 27 of the bottom surface 26. The front rail 28 is located adjacent the inflow or leading end of the slider body 22. The front rail 28 is designed to extend in the lateral direction of the slider body 22 along the inflow or leading end of the bottom surface 26. A pair of side rails 29 are respectively connected to the opposite ends of the front rail 28. The side rails 29 are designed to extend on the flat base 27 toward the trailing end of the slider body 22. An air bearing surface (ABS) 30 is defined on the top surfaces of the front rail 28 and the side rails 29. The airflow 25 serves to generate a positive pressure or lift on the air bearing surface 30. As shown in FIG. 2, pads 31 may additionally be formed on the front rail 28 at the air bearing surface 30. The pads 31 are expected to generate a larger positive pressure or lift through steps at inflow positions.

A rear rail 32 is formed over the slider body 22 and the head protection film 24 on the flat base 27 at a location adjacent the trailing end of the slider body 22. The rear rail 32 is positioned at the centerline in the lateral direction. An air bearing surface (ABS) 33 is likewise defined on the top surface of the rear rail 32. The airflow 25 serves to generate a positive pressure or lift on the air bearing surface 33. The read/write electromagnetic transducer 23 is designed to expose a read gap and a write gap at the air bearing surface 33, as described later in detail.

When the airflow 25 acts on the head slider 19 from the rotating magnetic recording disk 13, a lift is generated at the air bearing surfaces 30, 33. The generated lift allows the flying head slider 19 to fly above the surface of the rotating magnetic recording disk 13. Part of the airflow is guided toward the trailing end of the slider body 22 along the outside surface of the side rails 29 after colliding against the front surface of the front rail 28. The airflow is prevented from entering the space behind the front rail 28 from the opposite ends of the front rail 28 in the lateral direction. The airflow having passed over the air bearing surface 30 on the front rail 28 is allowed to easily expand in the vertical direction perpendicular to the surface of the magnetic recording disk 13 behind the front rail 28. This rapid expansion of the airflow generates a negative pressure acting on the flying head slider 19. The generated negative pressure is balanced with the aforementioned lift so that the flying head slider 19 flies above the magnetic recording disk 13 by a stabilized flying height.

Next, a detailed description will be made on the structure of the slider body 22 referring to FIG. 3. A pair of slits 35 are defined in the slider body 22 at the trailing end surface thereof. The slits 35 are designed to extend toward the leading end of the slider body 22. The slits 35 are arranged in parallel with a longitudinal datum plane 36. The shape of the bottom surface 26 is set symmetric relative to the longitudinal datum plane 36. The slits 35 penetrate through the slider body 22 between the bottom surface 26 and the top surface, namely, between the outer surface facing upward and the outer surface facing downward.

A stationary block 37 and a movable block 38 are defined in the slider body 22. The stationary block 37 is designed to receive the front end of the gimbal spring at the top surface. The movable block 37 is at least partly spaced from the stationary block 37 by the slits 35. The gimbal spring may be adhered to the stationary block 37. As is apparent from FIG. 3, the read/write electromagnetic transducer 23 is mounted on the trailing end surface of the movable block 38. The aforementioned rear rail 32 stands on the flat base 27 extending over the movable block 38.

A void 41 is defined in the slider body 22 between the slits 35. The void 41 includes a first elongated gap 42 extending in the lateral direction between the slits 35. The first elongated gap 42 serves to define the leading end surface of the movable block 38. A pair of second elongated gaps 43 are connected to the opposite ends of the first elongated gap 42. The second elongated gaps 43 are designed to extend in parallel with the corresponding slits 35 toward the trailing end of the slider body 22. The second elongated gaps 43 end positions spaced from the trailing end of the slider body 22. At the same time, the second elongated gaps 43 extend from the opposite ends of the first elongated gap 42 toward the leading end of the slider body, respectively, in parallel with the corresponding slits 35. The first and second elongated gaps 42, 43 penetrate through the slider body 22 between the bottom surface 26 and the top surface, namely, between the outer surface facing upward and the outer surface facing downward in the same manner as the slits 35.

An elastic plate or plate spring 44 is defined between the individual second elongated gap 43 and the corresponding slit 35. The plate spring 44 is designed to continuously extend from the stationary block 37 to the movable block 38. The plate springs 44 serve to couple the movable block 38 with the stationary block 37. The plate springs 44 are kept in an attitude standing from a plane including the flat base 27 of the bottom surface 26. Specifically, the thickness t of the plate springs 44 can be defined along the flat base 27. The movable block 38 is thus allowed to displace in the lateral direction of the slider body 22, perpendicularly to the recording tracks, relative to the stationary block 37 or the head suspension 18. The width W1 of the slit 35 corresponds to the extent of movement of the movable block 38 in the direction perpendicular to the recording tracks.

Figure 3:
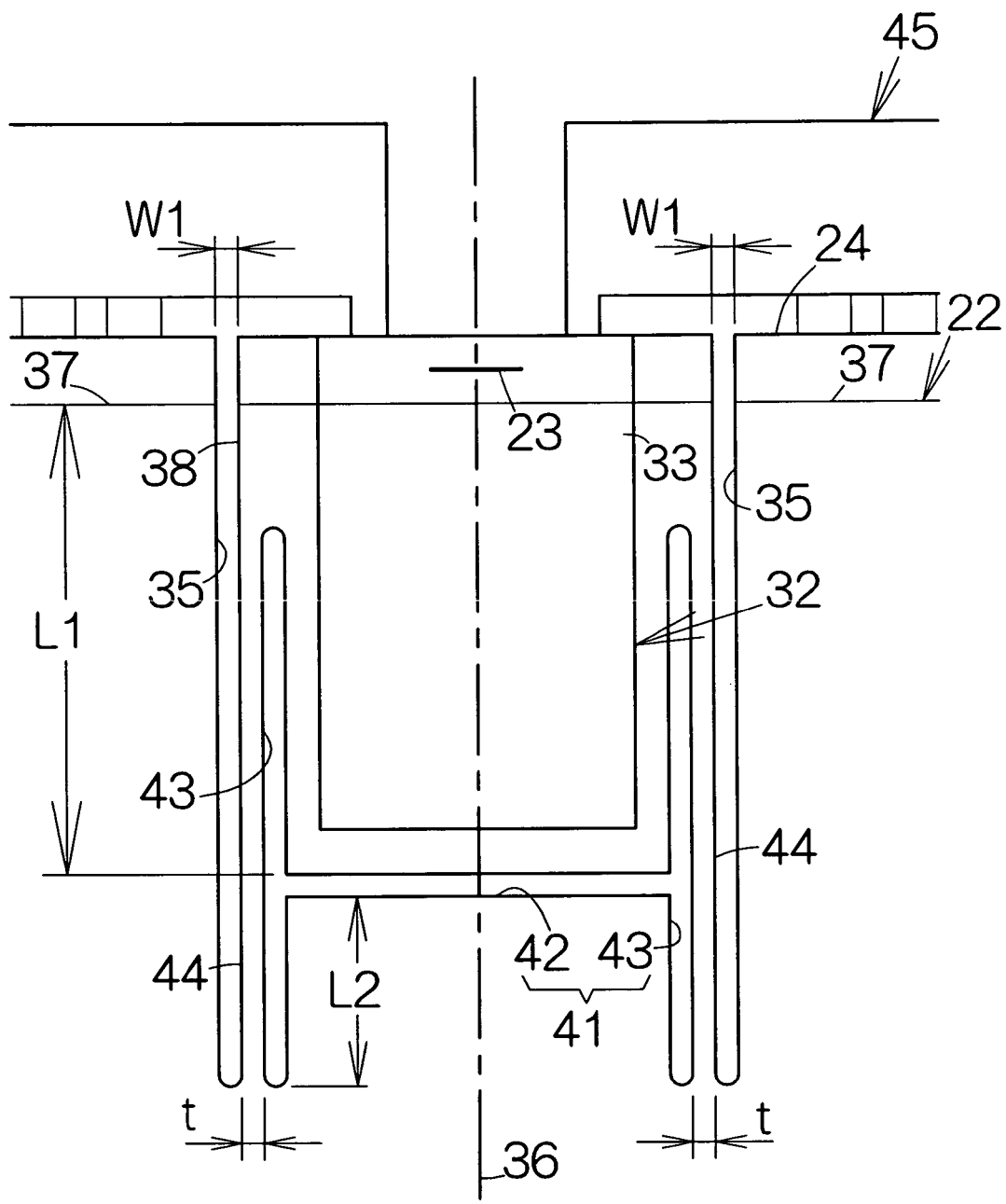
FIG. 3 is an enlarged plan view illustrating in detail a main portion of a slider body in the flying head slider.
Figure 4:
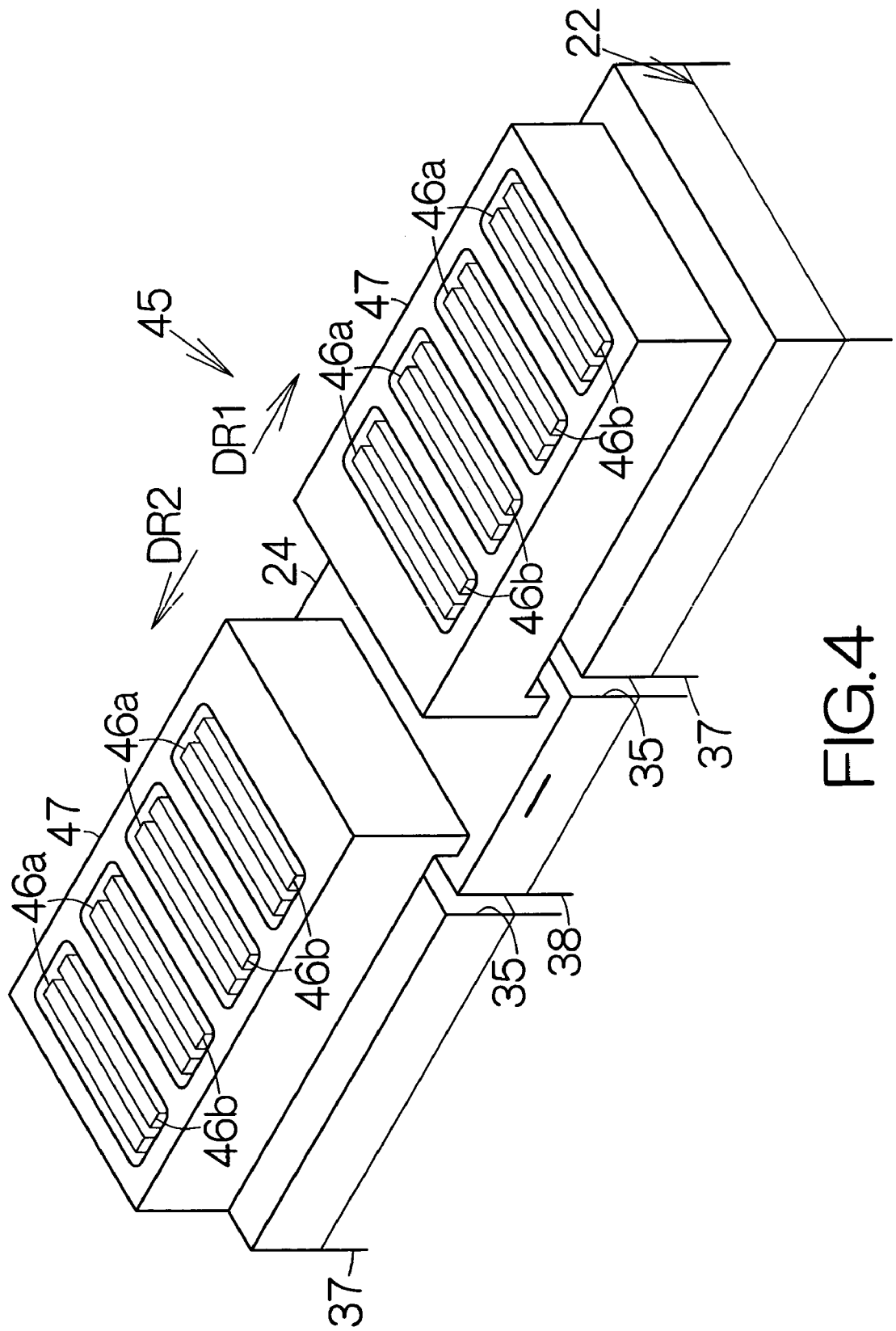
FIG. 4 is an enlarged partial perspective view of the flying head slider for schematically illustrating the structure of a microactuator.

As shown in FIG. 3, a microactuator 45 is mounted on the trailing end surface of the slider body 22 across the slits 35. As is apparent from FIG. 4, the microactuator 45 includes pairs of first and second stationary teeth 46a, 46b standing on the surface of the head protection film 24 overlaid on the trailing end surface of the stationary block 37. Driven frames 47 are designed to surround the corresponding pairs of the first and second stationary teeth 46a, 46b. The driven frames 47 are fixed to the surface of the head protection film 24 overlaid on the trailing end surface of the movable block 38. Predetermined gaps are established between the driven frames 47 and the stationary block 37. The driven frames 47 are allowed to displace relative to the stationary block 37 without contacting the stationary block 37.

Figure 5:
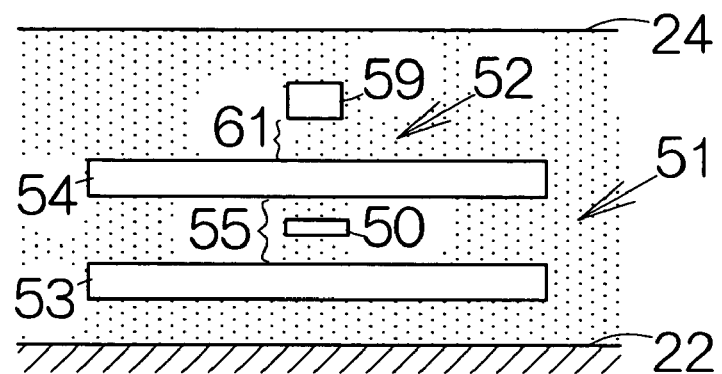
FIG. 5 is an enlarged plan view schematically illustrating the structure of a read/write electromagnetic transducer.

Next, a brief description will be made on the structure of the aforementioned read/write electromagnetic transducer 23. As shown in FIG. 5, the read/write electromagnetic transducer 23 includes a read head 51 and an inductive write head or thin film magnetic head 52. The read head 51 utilizes a magnetoresistive (MR) element 50 so as to discriminate bit data on the magnetic recording disk 13. The thin film magnetic head 52 is designed to establish bit data on the magnetic recording disk 13 by utilizing a magnetic field induced in a thin film swirly coil pattern. The MR element 50 is located in a space between upper and lower shielding layers 54, 53 along the trailing end surface of the movable block 38. The read gap 55 is in this manner defined between the upper and lower shielding layers 54, 53. The MR element 50 may be a giant magnetoresistive (GMR) element, a tunnel-junction magnetoresistive (TMR) element, or the like.

Figure 6:
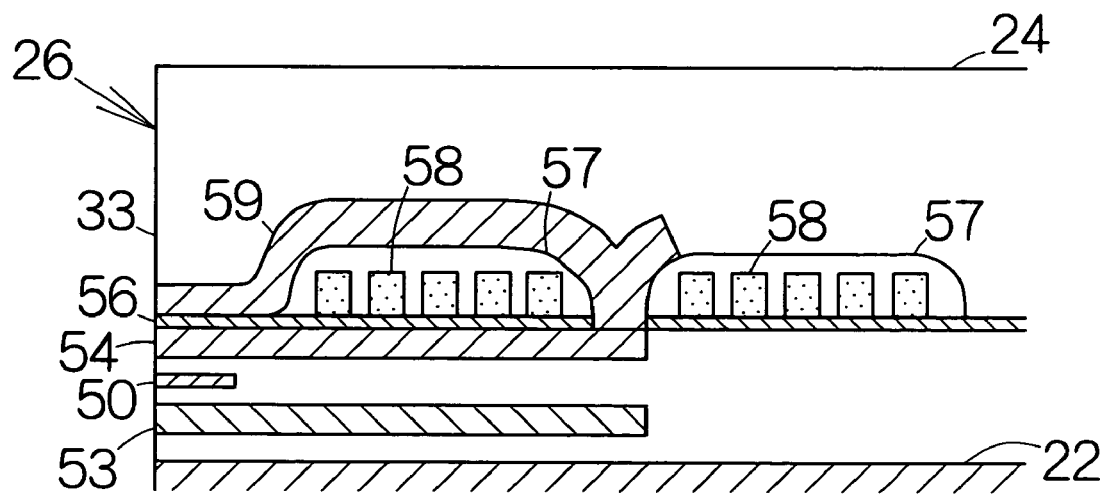
FIG. 6 is a sectional view taken along the line 6—6 in FIG. 5.

As is apparent from FIG. 6, the upper and lower shielding layers 54, 53 extend rearward from the front ends exposed at the bottom surface or the air bearing surface 33 on the rear rail 32. The upper and lower shielding layers 54, 53 may extend along planes perpendicular to the air bearing surface 33. The upper and lower shielding layers 54, 53 may be made of a magnetic material such as FeN and NiFe, for example.

The thin film magnetic head 52 includes a non-magnetic gap layer 56 extending over the upper surface of the upper shielding layer 54, as shown in FIG. 6. The non-magnetic gap layer 56 exposes the tip or front end at the air bearing surface 33 on the rear rail 32. The swirly coil pattern 58 is contained within an insulating layer 57 formed on the non-magnetic gap layer 56. The swirly coil pattern 58 may be made of an electrically-conductive metallic material such as Cu, for example.

An upper magnetic pole layer 59 is formed on the upper surface of the insulating layer 57. The rear end of the upper magnetic pole layer 59 is magnetically coupled to the upper shielding layer 54 at a central position of the swirly coil pattern 58. The upper magnetic pole layer 59 and the upper shielding layer 54 cooperate with each other so as to form a magnetic core penetrating through the central position of the swirly coil pattern 58. Specifically, the upper shielding layer 54 of the read head 51 also functions as the lower magnetic pole layer of the thin film magnetic head 52. When a magnetic field is generated at the swirly coil pattern 58 in response to supply of an electric current, a magnetic flux runs through the magnetic core. The upper magnetic pole layer 59 may be made of a magnetic material such as FeN and NiFe, for example.

The write gap 61 is defined in the thin film magnetic head 52 between the front end of the upper magnetic pole layer 59 and the front end of the upper shielding layer 54 at the air bearing surface 33. The non-magnetic gap layer 56 allows the magnetic flux to leak out of the bottom surface 26 or the air bearing surface 33 from the magnetic core at the front ends of the upper magnetic pole layer 59 and the upper shielding layer 54. The leaked magnetic flux forms a magnetic field for recordation. The gap length of the write gap 61 can be set based on the thickness of the non-magnetic gap layer 56.

Referring again to FIG. 4, when an electric current is supplied to the first stationary teeth 46a of the microactuator 45 in the flying head slider 19, a static electricity is induced at the first stationary teeth 46a. The induced static electricity serves to drive the driven frames 47 in a first direction DR1. On the other hand, when an electric current is supplied to the second stationary teeth 46b, a static electricity is induced at the second stationary teeth 46b. The induced static electricity causes the movement of the driven frames 47 in a second direction DR2 reversed from the first direction DR1. The movement of the driven frames 47 realizes a fine displacement of the movable block 38 in the lateral direction perpendicular to the recording tracks. Since the movable block 38 has the mass remarkably smaller than that of the slider body 22, the read/write electromagnetic transducer 23 is allowed to rapidly move within the slider body 22. The fine movement of the movable block 38, combined with the rough movement based on the movement of the carriage 16, allows the read/write electromagnetic transducer 23 to finely follow a target recording track on the magnetic recording disk 13.

In particular, the air bearing surface 33 is defined on the rear rail 32 on the movable block 38 in the flying head slider 19, so that the movable block 38 is allowed to enjoy a stabilized flying height above the surface of the magnetic recording disk 13. Accordingly, the read gap 55 and the write gap 61 on the movable block 38 can be opposed to the surface of the magnetic recording disk 13 at a constant distance.

In addition, the mass of the movable block 38 can be controlled in the flying head slider 19 on the basis of the length L1 measured between the first elongated gap 42 and the trailing end surface of the slider body 22, as is apparent from FIG. 3, for example. Specifically, the closer to the trailing end the first elongated gap 42 is located, the smaller the mass of the movable block 38 gets. Moreover, even if the first elongated gap 42 is located closer to the trailing end, the plate springs 44 of a sufficient length can be formed based on the length L2 of the second elongated gap 43 extending from the first elongated gap 42 toward the leading end of the slider body 22. A wider variety of design can be ensured for designing the movable block 38 and the plate springs 44.

Figure 7:
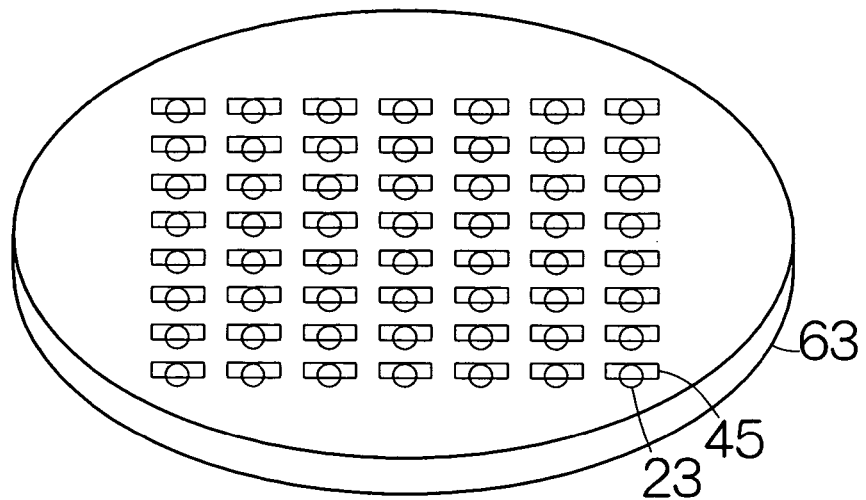
FIG. 7 is a perspective view of a wafer for schematically illustrating the read/write electromagnetic transducers and the microactuators formed on the upper surface of the wafer.
Figure 8:
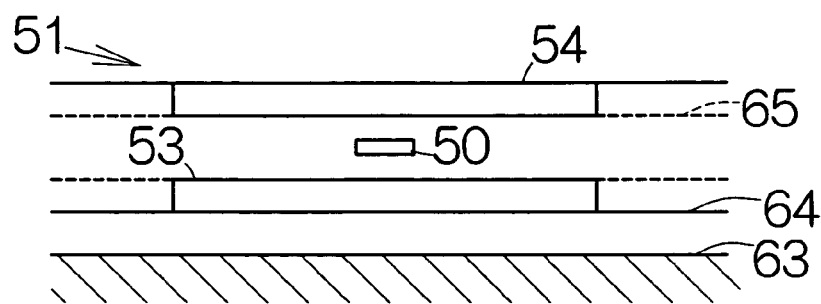
FIG. 8 is an enlarged partial sectional view of the wafer for schematically illustrating a process of forming a read head.

Next, a brief description will be made on a method of making the flying head slider 19. First of all, the read/write electromagnetic transducers 23 as well as the microactuators 45 are formed on a wafer 63 made of Si (silicon), as shown in FIG. 7. As is apparent from FIG. 8, for example, an undercoat or $Al_2O_3$ (alumina) film 64, corresponding to a lower half of the head protection film 24, is formed on the surface of the wafer 63 prior to the formation of the read/write electromagnetic transducers 23 and the microactuators 45. The alumina film 64 may be formed to have a constant thickness all over the surface of the wafer 63 in accordance with a conventional method.

The read head 51 is then formed on the alumina film 64 over the wafer 63. The alumina film 64 sequentially receives the lower shielding layer 53, a non-magnetic layer 65 containing the MR element 50, and an upper shielding layer 54. Deposition may be employed to form the layers 53, 65, 54 in a conventional manner. Since the lower shielding layer 53, the MR element 50, the non-magnetic layer 65 and the upper shielding layer 54 are deposited on the flat surface of the wafer 63, the layers 53, 65, 54 and the MR element 50 can be formed at a relatively higher accuracy as conventionally known.

Figure 9:
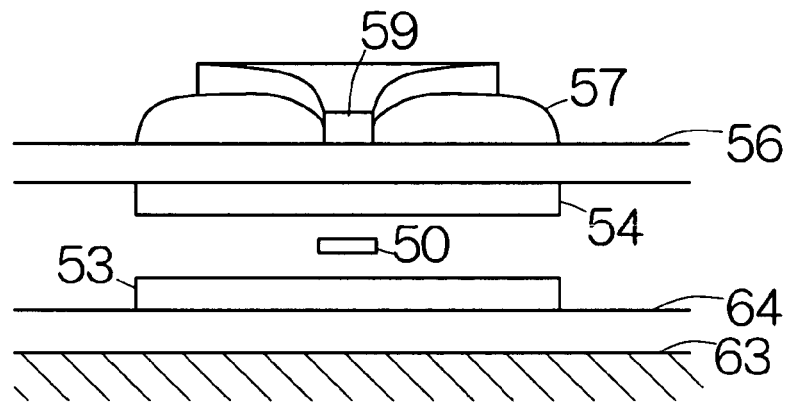
FIG. 9 is an enlarged partial sectional view of the wafer for schematically illustrating a process of forming a thin film magnetic head.

As shown in FIG. 9, the thin film magnetic head 52 is formed on the upper shielding layer 54. The upper shielding layer 54 receives the non-magnetic gap layer 56, the insulating layer 57 swelling from the non-magnetic gap layer 56 so as to contain the swirly coil pattern 58, and the upper magnetic pole layer 59 spreading over the upper surface of the insulating layer 57, in this sequence. The thickness of the non-magnetic gap layer 56 can easily be controlled on the upper shielding layer 54.

Figure 10:
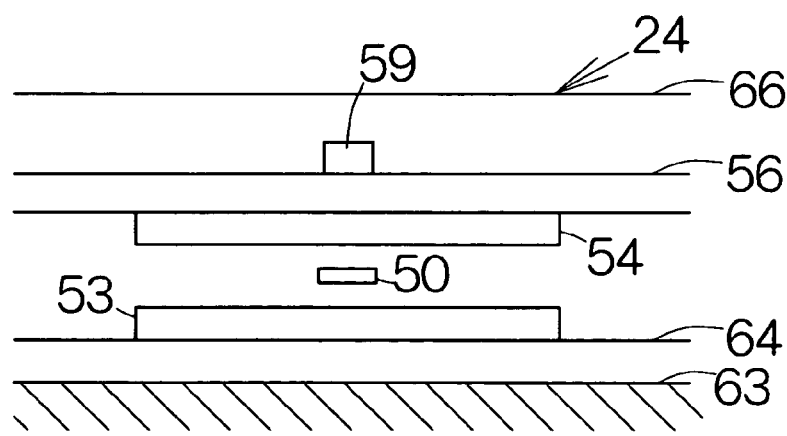
FIG. 10 is an enlarged partial sectional view of the wafer for schematically illustrating a process of forming a head protection film.

When the read head 51 and the thin film magnetic head 52 have been established in the aforementioned manner, an overcoat or $Al_2O_3$ (alumina) film 66, corresponding to an upper half of the protection layer 24, is formed over the surface of the alumina film 64, as shown in FIG. 10, for example. The alumina film 66 may be formed to have a constant thickness all over the surface of the alumina film 64 in accordance with a conventional method. The upper surface of the alumina film 66 may be subjected to a flattening polishing process. The read/write electromagnetic transducer 23 has been embedded within the head protection film 24 in this manner.

Figure 11A:
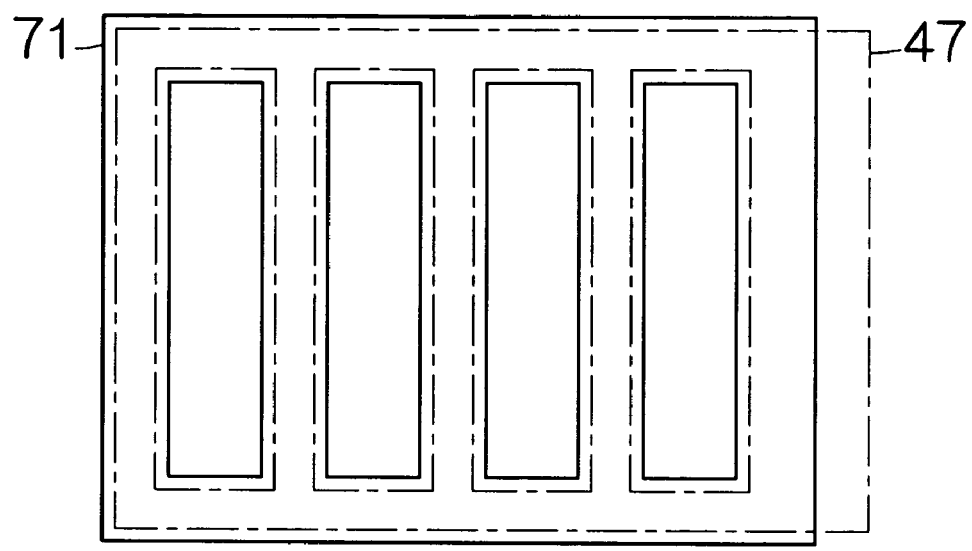
FIGS. 11A and 11B are enlarged partial plan views of the wafer for schematically illustrating a process of forming a microactuator.

The microactuator 45 is thereafter formed on the head protection film 24. A removable thin film 71 made of a metal or resin is formed on the upper surface of the head protection film 24. The removable thin film 71 may be shaped in correspondence with the shape of the driven frames 47 as shown in FIG. 11A.

Figure 11B:
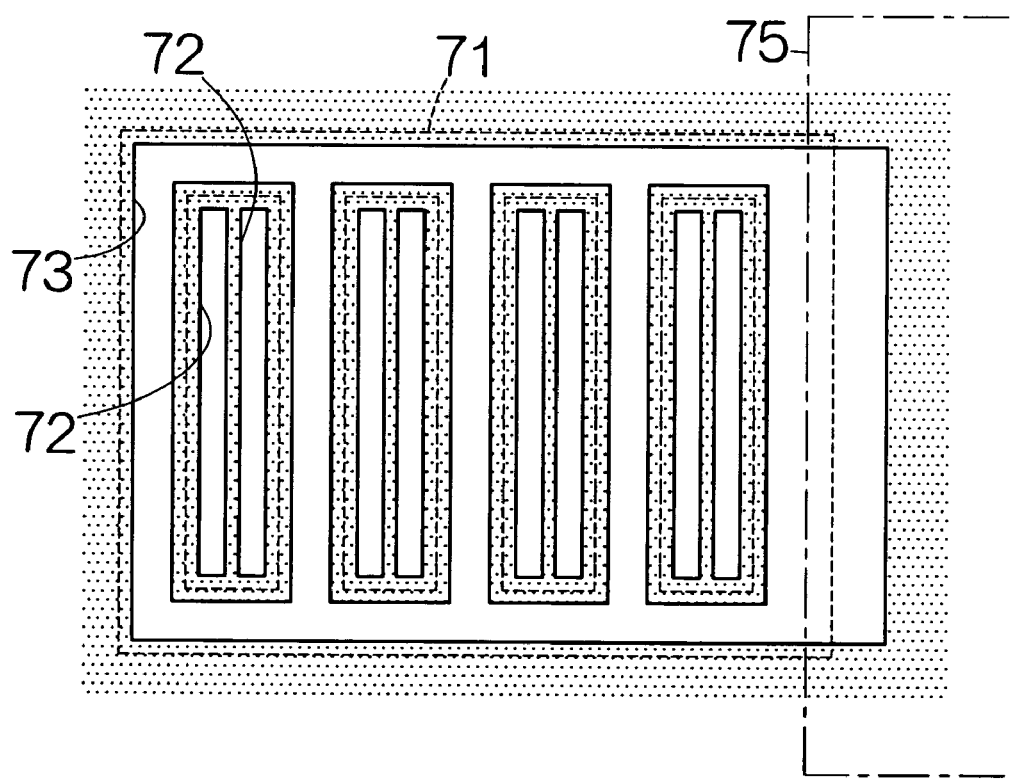

An electrically conductive underlayer is then formed to extend over the surface of the head protection film 24. The electrically conductive underlayer covers over the removable thin film 71. As shown in FIG. 11B, a resist film is formed on the surface of the electrically conductive underlayer. First voids 72 are defined in the resist film in accordance with the pattern of the first and second stationary teeth 46a, 46b. Second voids 73 are also defined in the resist film in accordance with the pattern of the driven frames 47. The electrically conductive underlayer, directly formed over the surface of the wafer 63 without the interposition of the removable thin film 71, is exposed at the bottom of the first voids 72. Likewise, the electrically conductive underlayer covering over the removable thin film 71 gets exposed at the bottom of the second voids 73. In this case, a particular area 75 is reserved for the movable block 38 on the wafer 63. The electrically conductive underlayer, directly formed over the surface of the wafer without the interposition of the removable thin film 71, is exposed at the bottom of the second voids 73 within the particular area 75.

An electroplating process is thereafter effected on the wafer 63. When an electric current is supplied to the electrically conductive underlayer within an electrolyte, certain materials get deposited on the electrically conductive underlayer within the first and second voids 72, 73. The first and second stationary teeth 46a, 46b and the driven frames 47 are thus formed. When the resist film is removed, the first and second stationary teeth 46a, 46b as well as the driven frames 47 appear on the surface of the wafer 63. The electrically conductive underlayer exposed at the surface of the wafer 63 is then removed. The removable thin film 71 is subsequently removed so that the formed driven frames 47 are separated from the surface of the wafer 63 outside the certain area 75. The driven frames 47 still keep the connection to the wafer 63 inside the certain area 75.

Figure 12:
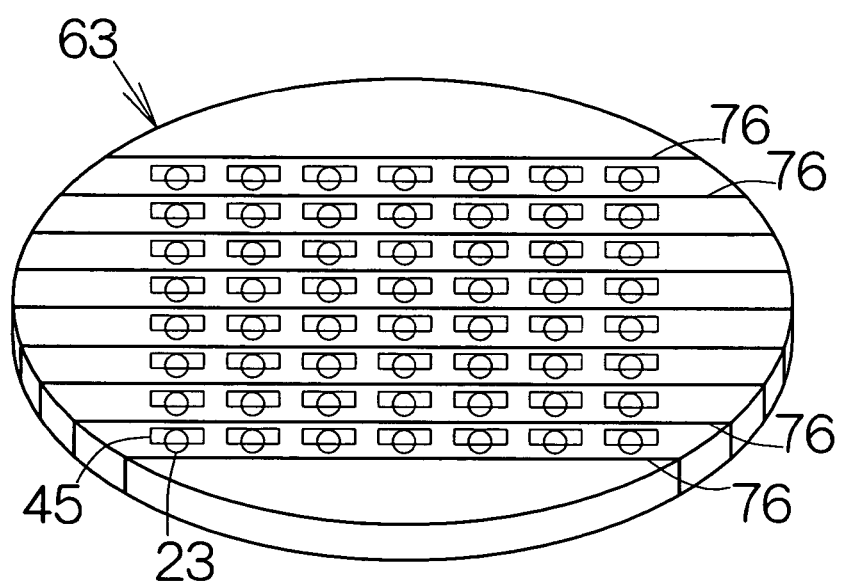
FIG. 12 is a perspective view of the wafer for illustrating an incision utilized to cut the wafer.
Figure 13:
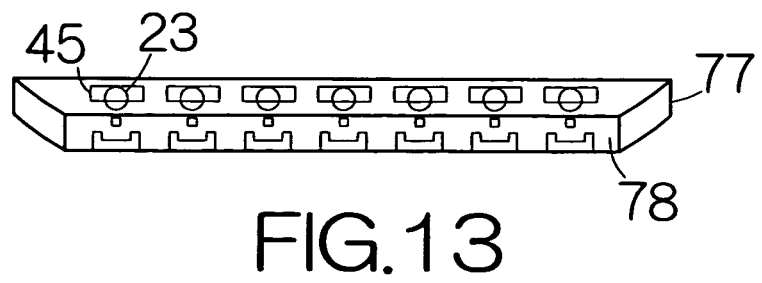
FIG. 13 is a perspective view of a bar material cut off from the wafer.

When the formation of the read/write electromagnetic transducer 23 and the microactuator 45 has been completed in the aforementioned manner, the wafer 63 is cut with an incision 76 along a plane perpendicular to the surface of the wafer 63, as shown in FIG. 12, for example. As shown in FIG. 13, a bar material 77 is cut off from the wafer 63. The bar material 77 contains a row of the read/write electromagnetic transducers 23 and the microactuators 45. The bottom surfaces 26 of the slider bodies 22 are shaped on the bar material 77 over the surface 78 that has been established with the incision 76. A conventional method may be employed to form the bottom surfaces 26. When the bottom surfaces 26 have been engraved, the read gap 55 as well as the write gap 61 gets exposed at the corresponding bottom surface 26. The bottom surfaces 26 are established in correspondence with the individual combinations of the read/write electromagnetic transducer 23 and the microactuator 45.

The slits 35 and the first and second elongated gaps 42, 43 are made on the bar material 77 for sections reserved for the individual flying head sliders 19. A deep reactive etching or inductively coupled plasma apparatus may be employed to form the slits 35 and the first and second elongated gaps 42, 43, for example. The deep reactive etching apparatus allows a high density plasma gas to penetrating through the bar material 77 from the bottom surface 26. The high density plasma gas serves to establish a slit and a gap having an aspect ratio ranging between 20 to 1 and 50 to 1. The high density plasma gas may also be employed to separate the individual flying head slider 19 from the bar material 77. The production of the flying head slider 19 is thus completed in this manner.

The above-described method enables the formation or deposition of the read/write electromagnetic transducer 23, expected to move within the slider body 22, over the wafer 63 in a conventional manner. In addition, the read/write electromagnetic transducer 23 can be mounted on the movable block 38 having the mass remarkably smaller than that of the slider body 22. Since the gap length of the read gap 55 and the write gap 61 depend on the thickness of the non-magnetic layer 65 and the non-magnetic gap layer 56, respectively, the gap length of the read gap 55 and the write gap 61 can be minimized in a facilitated manner. A conventional method of production can be utilized to form the read/write electromagnetic transducer 23 in the flying head slider 19 of the type described above.

Figure 14:
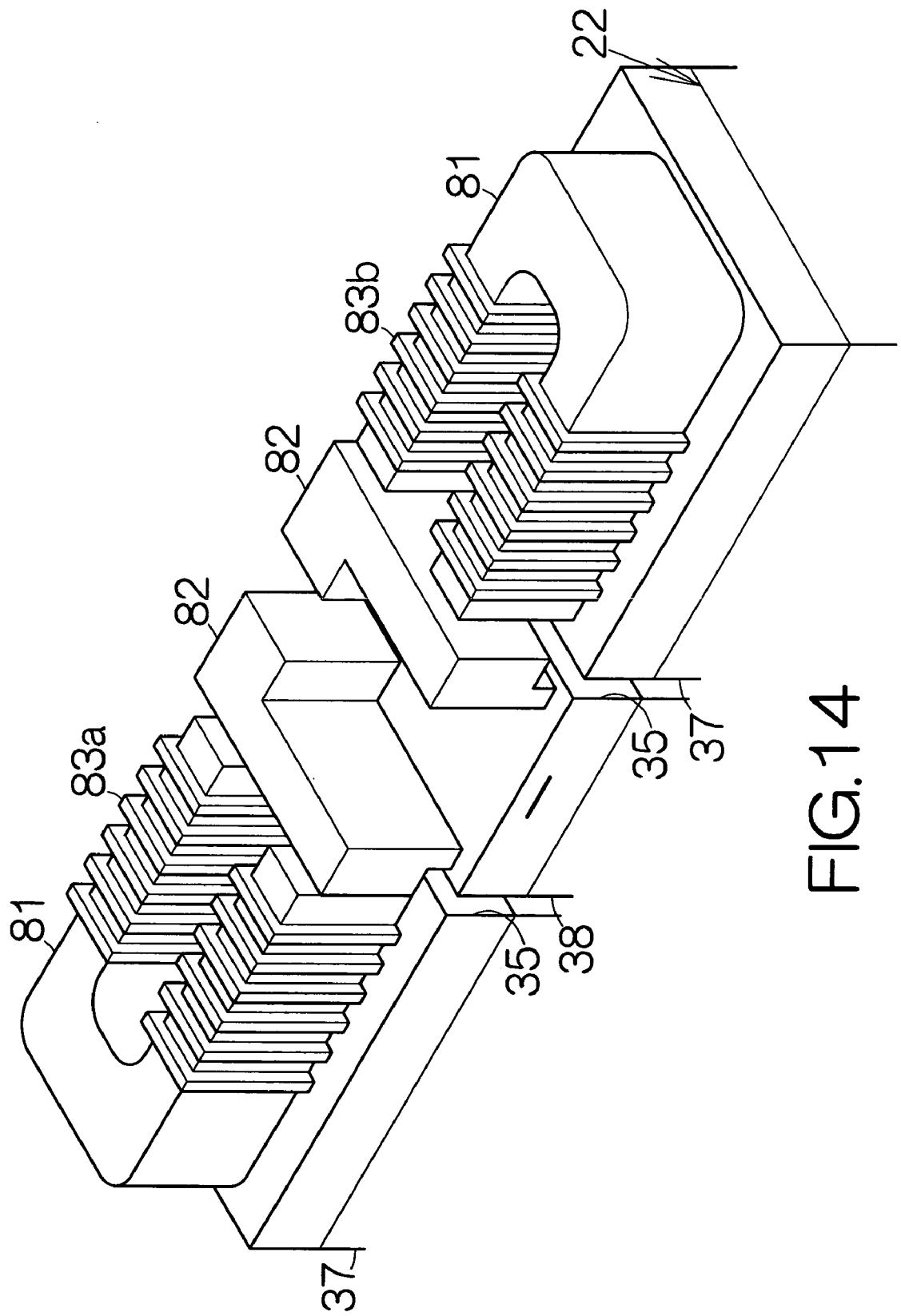
FIG. 14 is an enlarged partial perspective view of the flying head slider for schematically illustrating the structure of a microactuator according to another example.

Here, the microactuator 45 may take the form of an electromagnetic induction type, as shown in FIG. 14, in addition to the form of an electrostatic capacity type as described above. The microactuator 45 of the electromagnetic induction type may include stationary yokes 81 mounted on the surface of the head protection film 24 overlaid on the trailing end surface of the stationary block 37, and movable yokes 82 mounted on the surface of the head protection film 24 overlaid on the trailing end surface of the movable block 38. The movable yokes 82 are opposed to the corresponding stationary yokes 81 at a smaller distance. Coils 83a, 83b are wound around the stationary yokes 81. The coils 83a, 83b are insulated from the stationary yokes 81. When an electric current is supplied to any one of the coils 83a, 83b, the electromagnetic force is generated at the corresponding stationary yoke 81. The electromagnetic force serves to generate the movement of the movable block 38 toward the stationary block 38. The stationary and movable yokes 81, 82 may be made of any soft magnetic material, for example. Plating, vapor deposition, and sputtering may be employed to form the stationary and movable yokes 81, 82 as well as the coils 83a, 83b, for example.

What is claimed is:

1. A head slider comprising:
   a slider body having a trailing end surface defining a trailing end of the slider body farthest from a leading end of the slider body; and
   a slit defined in the trailing end surface of the slider body so as to separate a movable block from a stationary block in the slider body, said movable block including a part of the trailing end surface, said stationary block including a remaining part of the trailing end surface separated from the part of the trailing end surface by the slit.

2. The head slider according to claim 1, wherein said slit defines an elongated plate extending from the stationary block to the movable block.

3. The head slider according to claim 2, wherein said plate is kept in an attitude standing from a plane including a medium-opposed surface of the slider body.

4. The head slider according to claim 3, wherein said movable block displaces in a direction perpendicular to a recording track.

5. The head slider according to claim 4, further comprising a microactuator mounted on the trailing end surface of the slider body across the slit.

6. The head slider according to claim 1, wherein a rail is formed on a medium-opposed surface of the movable block, an air bearing surface being defined on the rail.

7. The head slider according to claim 6, wherein said slit defines an elongated plate extending from the stationary block to the movable block.

8. The head slider according to claim 7, wherein said plate is kept in an attitude standing from a plane including a medium-opposed surface of the slider body.

9. The head slider according to claim 8, wherein said movable block displaces in a direction perpendicular to a recording track.

10. The head slider according to claim 9, further comprising a microactuator mounted on the trailing end surface of the slider body across the slit.

11. The head slider according to claim 1, further comprising another slit defined in the trailing end surface of the slider body, said another slit extending from the trailing end of the slider body toward the leading end of the slider body, wherein the movable block is defined between the slits.

12. The head slider according to claim 11, wherein each of said slits defines an elongated plate extending from the stationary block to the movable block.

13. The head slider according to claim 12, wherein a void is formed in the slider body, said void cooperating with the slits to define the elongated plates.

14. The head slider according to claim 13, wherein said void includes:
   a first gap extending between the slits so as to define a leading end of the movable block; and
   a pair of second gaps extending from opposite ends of the first gap toward the trailing end of the slider body, respectively, in parallel with the slits, said second gaps ending at positions spaced from the trailing end of the slider body.

15. The head slider according to claim 14, wherein said second gaps extend from the opposite ends of the first gap toward the leading end of the slider body, respective, in parallel with the slits.

16. A head assembly comprising:
    a head suspension;
    a slider body mounted on the head suspension, said slider body having a trailing end surface defining a trailing end of the slider body farthest from a leading end of the slider body; and
    a slit defined in the trailing end surface of the slider body so as to separate a movable block from a stationary block in the slider body, said movable block including a part of the trailing end surface, said stationary block including a remaining part of the trailing end surface separated from the part of the trailing end surface by the slit.

* * * * *